(12) United States Patent
Mitobe et al.

(10) Patent No.: US 11,860,431 B2
(45) Date of Patent: Jan. 2, 2024

(54) CABLE TRACTION TERMINAL STRUCTURE

(71) Applicant: Fujikura Ltd., Tokyo (JP)

(72) Inventors: Ryoichi Mitobe, Sakura (JP); Kansei Shindo, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/921,836

(22) PCT Filed: Apr. 13, 2021

(86) PCT No.: PCT/JP2021/015297
§ 371 (c)(1),
(2) Date: Oct. 27, 2022

(87) PCT Pub. No.: WO2021/225062
PCT Pub. Date: Nov. 11, 2021

(65) Prior Publication Data
US 2023/0161126 A1    May 25, 2023

Related U.S. Application Data

(60) Provisional application No. 63/021,100, filed on May 7, 2020.

(51) Int. Cl.
 *G02B 6/44* (2006.01)
(52) U.S. Cl.
 CPC ....... *G02B 6/44384* (2023.05); *G02B 6/4431* (2023.05)

(58) Field of Classification Search
None
See application file for complete search history.

(56) References Cited

U.S. PATENT DOCUMENTS

| | | | | |
|---|---|---|---|---|
| 3,357,423 A | * | 12/1967 | Winchester | A61B 1/07 600/249 |
| 4,610,505 A | * | 9/1986 | Becker | G02B 6/4429 174/109 |
| 6,906,264 B1 | * | 6/2005 | Grant, Jr. | H02G 3/0468 174/102 R |
| 11,666,251 B2 | * | 6/2023 | Boucher | A61B 5/145 600/309 |

(Continued)

FOREIGN PATENT DOCUMENTS

| | | |
|---|---|---|
| JP | H04-085302 U | 7/1992 |
| JP | H09-230186 A | 9/1997 |

(Continued)

OTHER PUBLICATIONS

International Search Report issued in corresponding International Application No. PCT/JP2021/015297 dated Jul. 6, 2021 (2 pages).

*Primary Examiner* — Jerry Rahll
(74) *Attorney, Agent, or Firm* — Osha Bergman Watanabe & Burton LLP (57) ABSTRACT

An optical cable traction terminal structure includes: a helically wound inner tube that houses an optical cable; and a flexible outer tube disposed on an outer circumferential surface of the helically wound inner tube, wherein a part of the flexible outer tube enters an inside of a groove on the outer circumferential surface of the helically wound inner tube.

6 Claims, 7 Drawing Sheets

(56) References Cited

U.S. PATENT DOCUMENTS

| | | | | |
|---|---|---|---|---|
| 2007/0083132 A1* | 4/2007 | Sharrow | ............ | A61M 25/0012 600/431 |
| 2011/0075980 A1* | 3/2011 | Register, III | ......... | G02B 6/4429 385/113 |
| 2014/0369656 A1* | 12/2014 | Gimblet | ............ | B29D 11/00663 385/113 |
| 2020/0037931 A1* | 2/2020 | Boucher | ................. | H01F 27/28 |

FOREIGN PATENT DOCUMENTS

| | | |
|---|---|---|
| JP | 2002-131600 A | 5/2002 |
| JP | 2006-009811 A | 1/2006 |
| JP | 2010-217316 A | 9/2010 |
| JP | 2016-144293 A | 8/2016 |
| KR | 100659017 B1 | 12/2006 |

* cited by examiner

CABLE TRACTION TERMINAL STRUCTURE

CROSS-REFERENCE TO RELATED APPLICATIONS

The present application claims priority from U.S. Provisional Patent Application No. 63/021100, filed May 7, 2020, and International Patent Application No. PCT/JP2021/015297, filed in Japan on Apr. 13, 2021, the contents of which are incorporated herein by reference in their entirety.

BACKGROUND

Technical Field

The present invention relates to a cable traction terminal structure.

Description of Related Art

In recent years, with the development of optical communication technology using optical fibers, the number of optical fibers laid has increased dramatically. Therefore, when optical cables in which optical fibers are bundled are connected between data centers, in many cases, a cable traction terminal is used in order to route thousands of optical fibers at the same time. Various developments have been made on this cable traction terminal structure. For example, the cable traction terminal structure described in Patent Document 1 includes a flexible tube formed by helically connecting molded members having a substantially groove-shaped cross section to each other, a metal net body that covers the outer circumferential surface of the flexible tube, and a heat-shrinkable tube that covers the outer circumferential surface of the metal net body. This heat-shrinkable tube prevents water from entering the inner tube.

PATENT DOCUMENT

Patent Document 1: JP H 9-230186

Since the heat-shrinkable tube of Patent Document 1 has low extensibility (compressibility), wrinkles are formed on the inner diameter side of the heat-shrinkable tube when, for example, the cable traction terminal is bent. Then, when the cable traction end is routed, there is a possibility that water may enter the inner tube due to cracks on the outer circumferential surface of the heat-shrinkable tube, such as local friction and tearing against the wrinkles.

SUMMARY

A cable traction terminal structure according to one or more embodiments can prevent water from entering the inner tube.

According to one or more embodiments, there is provided an traction terminal structure comprising: an inner tube configured to house an optical cable inside and be formed by helically winding and connecting a strand; and a flexible outer tube provided on an outer circumferential surface of the inner tube, and a part of the outer tube enters an inside of a groove formed on the outer circumferential surface of the inner tube.

According to one or more embodiments, because a part of the outer tube enters the groove, the outer tube in the groove follows the bending of the inner tube even when a force for bending the inner tube is applied. As a result, it is possible to mitigate the occurrence of unevenness on the outer circumferential surface of the outer tube. Therefore, since cracks are less likely to occur on the outer circumferential surface of the inner tube, it is possible to prevent water from entering the inner tube.

A connecting member may be provided on the outer circumferential surface of a rear end of the inner tube.

A protrusion may be formed on an inner wall of the connecting member, and the protrusion may be fitted into the groove of the inner tube.

The connecting member may be overlapped with a rear end of the inner tube and may be overlapped with a rear end of the outer tube.

The connecting member may be adhered at least at an overlapping part overlapped with the rear end of the outer tube.

At the overlapping part, the connecting member may be formed with a recess portion at a position facing the outer tube, and an adhesive may be provided in the recess portion.

A gap may be provided between the outer tube and the connecting member in the longitudinal direction of the inner tube, and a water blocking member may be provided in the gap.

The water blocking member may be a resin material.

According to one or more embodiments, it is possible to prevent water from entering the inner tube.

DETAILED DESCRIPTION

First Example

An optical cable traction terminal structure according to one or more embodiments will be described with reference to FIGS. 1 to 6.

Figure 1:
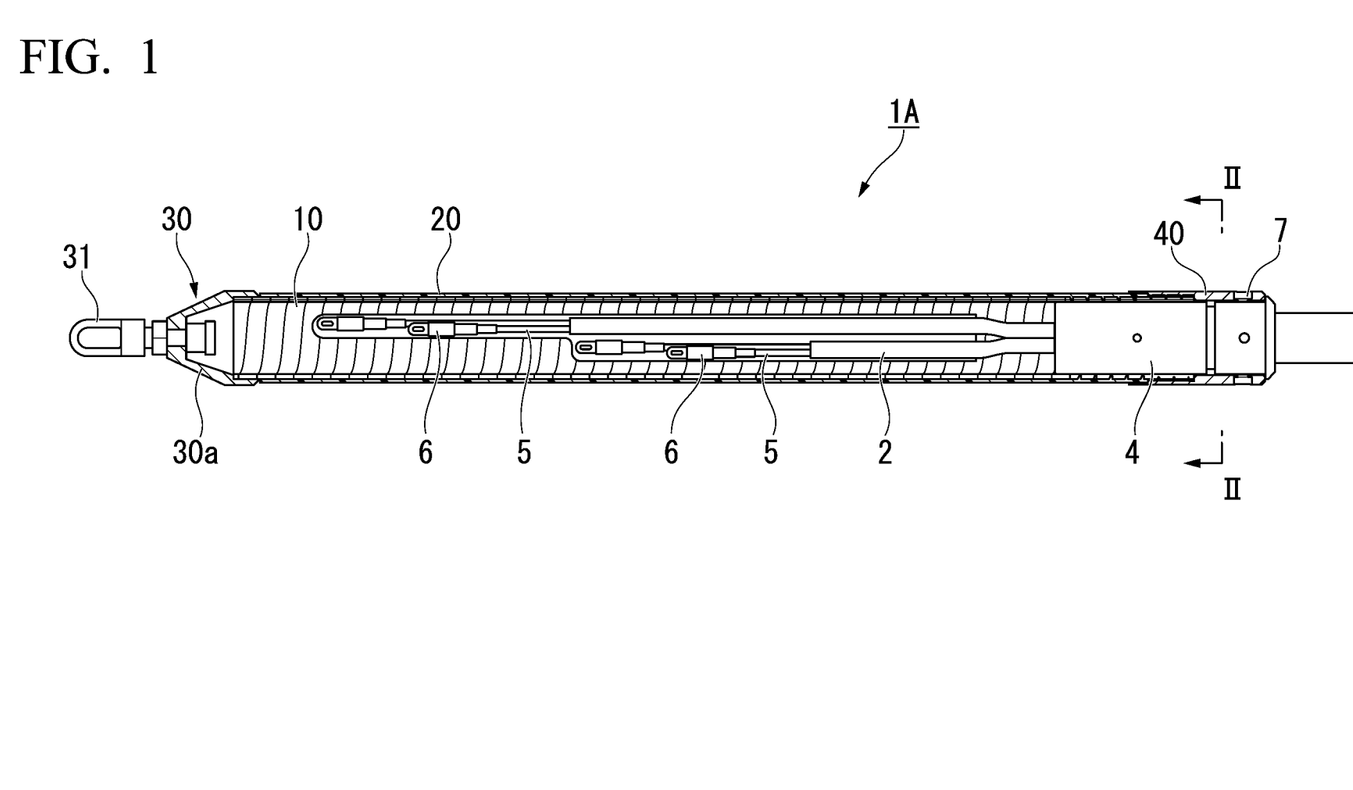
FIG. 1 is a cross-sectional view of a main part of an optical cable traction terminal structure according to one or more embodiments.

As shown in FIG. 1, an optical cable traction terminal structure 1A includes an inner tube 10, an outer tube 20, a cone-shaped head 30, and a connecting member 40.

Direction Definition

Here, in one or more embodiments, the longitudinal direction of the optical cable traction terminal structure 1A is simply referred to as the longitudinal direction. The tip end side provided with the head 30 in the optical cable traction terminal structure 1A may be referred to as a front end, and the base end side provided with the connecting member 40 in the optical cable traction terminal structure 1A may be referred to as a rear end. Further, the direction intersecting a central axis O (refer to FIG. 3) of the optical cable traction terminal structure 1A is referred to as a radial direction. Further, a cross section orthogonal to the central axis O is referred to as a cross section.

Figure 2:
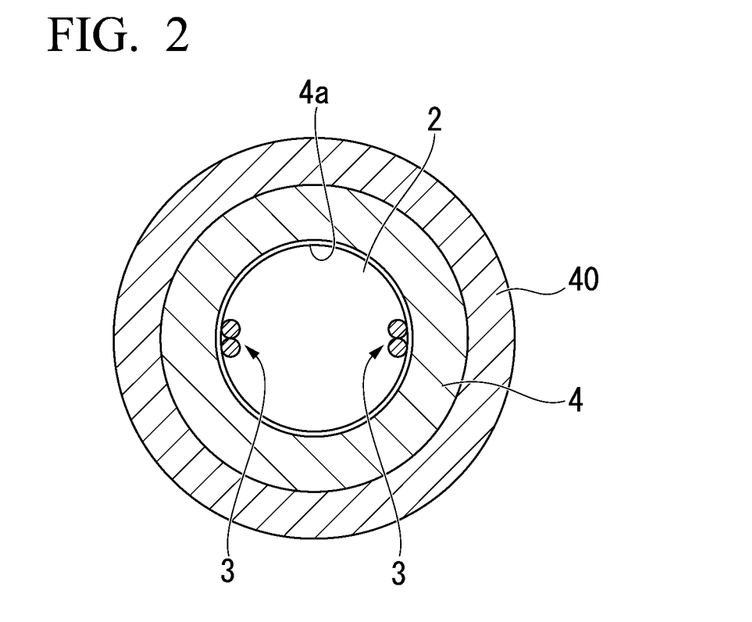
FIG. 2 is a cross-sectional view taken along the line II-II of FIG. 1.

As shown in FIGS. 1 and 2, the optical cable traction terminal structure 1A of one or more embodiments further includes an optical cable 2, a pair of tension members 3, and a holder 4.

The head 30 is provided on the tip end side of the optical cable traction terminal structure 1A, and the connecting member 40 is provided on the base end side of the optical cable traction terminal structure 1A.

The head 30 is a metal member and, as shown in FIG. 1, has a pulling eye 31 at the tip end. The head 30 is joined to the inner tube 10 by welding, for example. Further, the head 30 has an inclined portion 30a. The inclined portion 30a is configured such that the outer diameter gradually decreases from the base end toward the tip end. The pulling eye 31 is arranged at the tip end of the inclined portion 30a. By tying a rope or the like to the pulling eye 31, the optical cable traction terminal structure 1A is inserted into the inside of the duct pipe in the ground, and is likely to be hauled.

As shown in FIG. 1, the optical cable 2 is housed inside the inner tube 10. In one or more embodiments, for example, 3456 optical fibers 5 are bundled, and a connector 6 is terminated in each optical fiber 5.

As shown in FIG. 2, a pair of tension members 3 are provided so as to sandwich the optical cable 2 in the radial direction in a cross-sectional view (four in total). The tension member 3 functions as a member that receives a force such as tensile stress generated when the optical cable traction terminal structure 1A is hauled. In one or more embodiments, the number of tension members is four, but the number is not limited thereto.

The holder 4 is made of a tubular metal having a through-hole 4a through which the optical cable 2 is inserted. The holder 4 is fixed to the inner tube 10 by bolts 7 via the connecting member 40.

Further, the holder 4 has a tension member fixing portion (not shown) for fixing the tension member 3 on the inner circumferential surface of the through-hole 4a. By fixing the tension member 3 to the holder 4 in this manner, the force applied to the entire optical cable traction terminal structure 1A can be reliably received, and the robustness can be improved.

Figure 3:
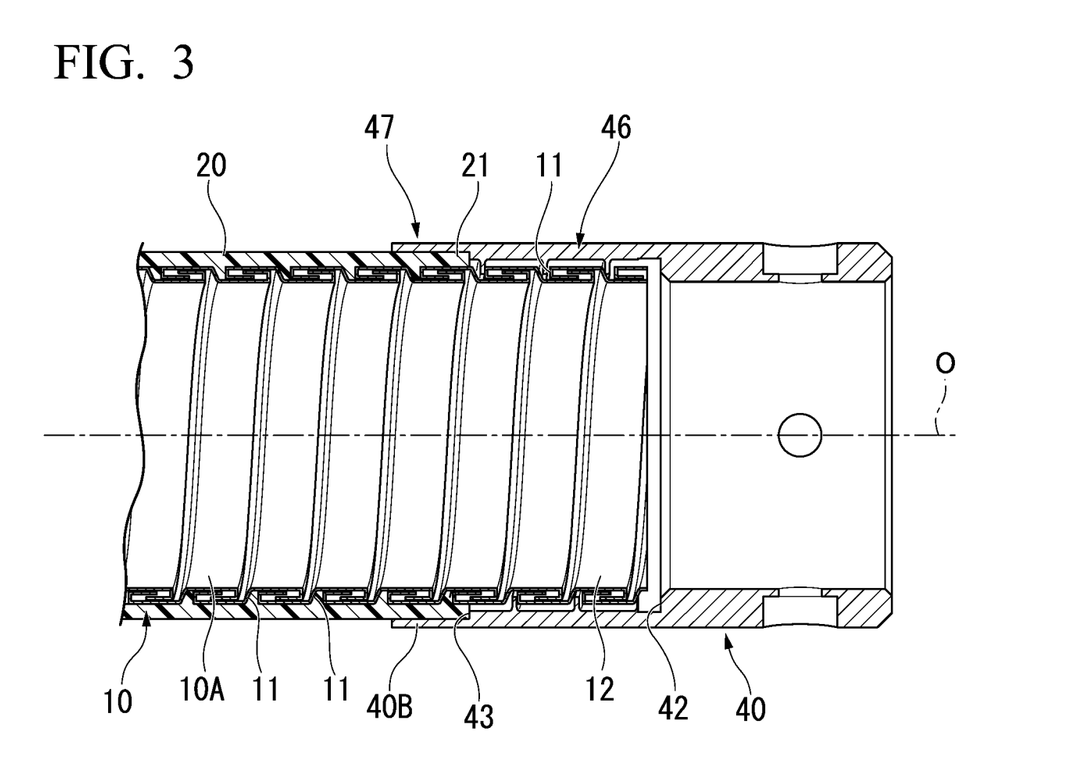
FIG. 3 is a cross-sectional view of a main part of a rear end of the optical cable traction terminal structure according to one or more embodiments.

As shown in FIG. 3, the inner tube 10 is configured as a tubular member (spiral tube) formed by helically winding a tape-shaped strand (for example, a stainless steel (SUS) plate) 10A and connecting the strands in the longitudinal direction. For example, the strands 10A are fitted by approximately ⅓ in the width direction and connected helically. With this configuration, the inner tube 10 has flexibility as a whole. Note that the optical cable 2 is not shown in FIG. 3 in order to make the drawing easier to see.

Figure 4:
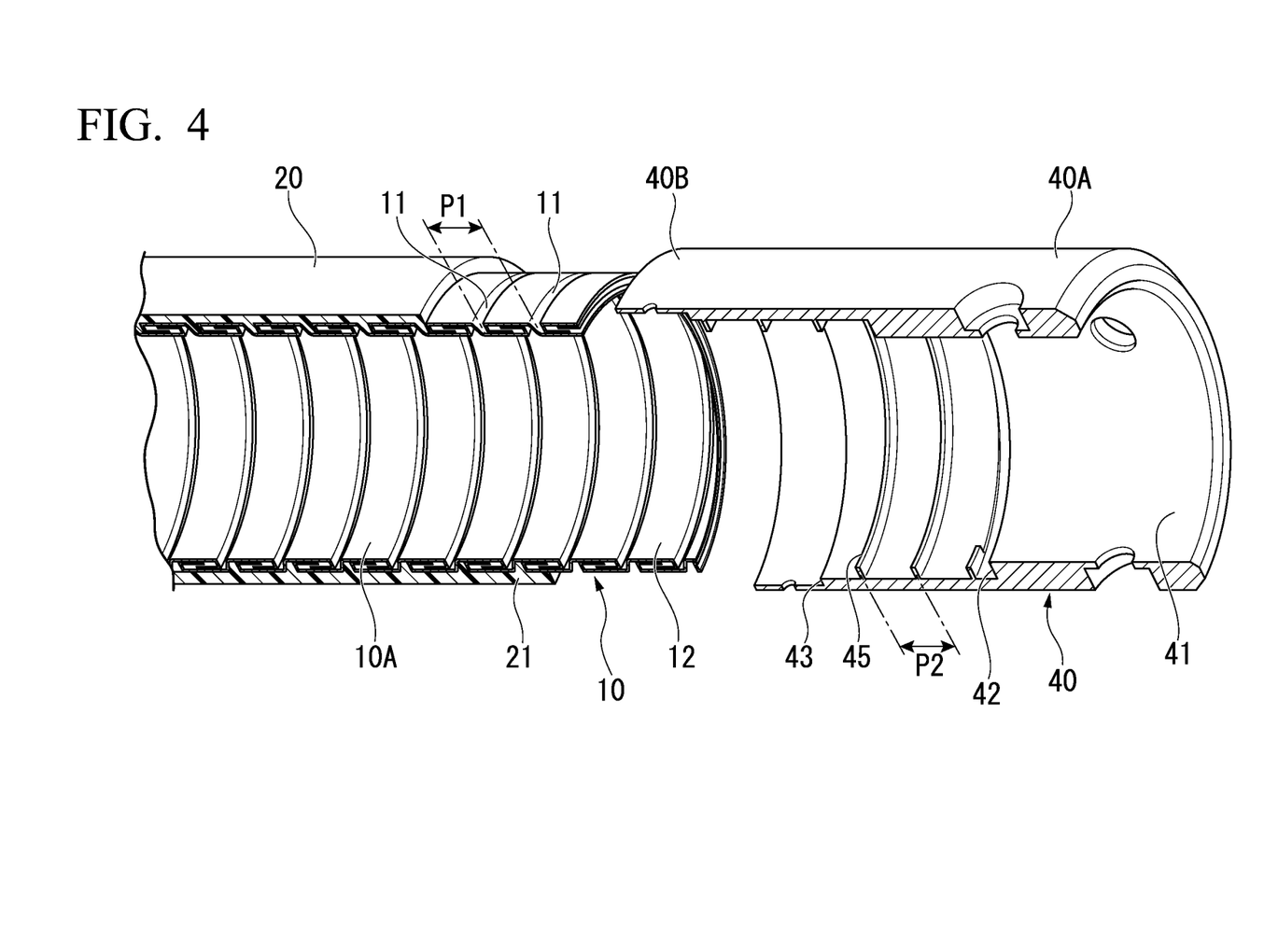
FIG. 4 is an exploded view of the rear end of the optical cable traction terminal structure according to one or more embodiments.

FIG. 4 is an exploded view of the rear end of the optical cable traction terminal structure according to one or more embodiments. As shown in FIG. 4, on the outer circumferential surface of the strand 10A, a groove 11 is formed in the central portion in the width direction along the longitudinal direction of the strand 10A. The space between the grooves 11 adjacent to each other in the longitudinal direction is formed by a groove pitch P1.

In one or more embodiments, since the strands 10A are fitted and connected helically, it is possible to maintain the inner diameter of the inner tube 10 even when tension is applied in the longitudinal direction.

As shown in FIG. 3, the outer tube 20 is provided on the outer circumferential surface of the inner tube 10 and has flexibility. A part of the outer tube 20 enters the inside of the groove 11 formed on the outer circumferential surface of the inner tube 10. That is, the groove 11 is filled with a part of the outer tube 20. Further, the outer tube 20 is not provided on the outer circumferential surface of a rear end 12 of the inner tube 10. The material of the outer tube 20 is, for example, an elastic body such as polyvinyl chloride, a polyolefin resin, a fluoropolymer, and a thermoplastic elastomer. As a result, even when the inner tube 10 is bent, the restorability to the linear state is improved.

The method of allowing a part of the outer tube 20 to enter the groove 11 of the inner tube 10 is not particularly limited, but for example, by immersing the inner tube 10 in a liquid polyolefin resin, the polyolefin resin is inserted into the groove 11 of the inner tube 10. Then, the liquid polyolefin resin is brought into close contact with the inner surface of the groove 11 and cured to have elastic force.

In the optical cable traction terminal structure 1A of one or more embodiments, as shown in FIG. 3, the connecting member 40 is provided on the outer circumferential surface of the rear end 12 of the inner tube 10.

As shown in FIG. 4, the connecting member 40 has a cylindrical shape. Inside the connecting member 40, in order from the rear end 40A side, an inner circumferential surface 41, a first recess portion 42 recessed with respect to the inner circumferential surface 41, and a second recess portion 43 recessed with respect to the first recess portion 42 are formed. The inner diameter of the first recess portion 42 and the inner diameter of the second recess portion 43 are larger in this order.

Figure 5:
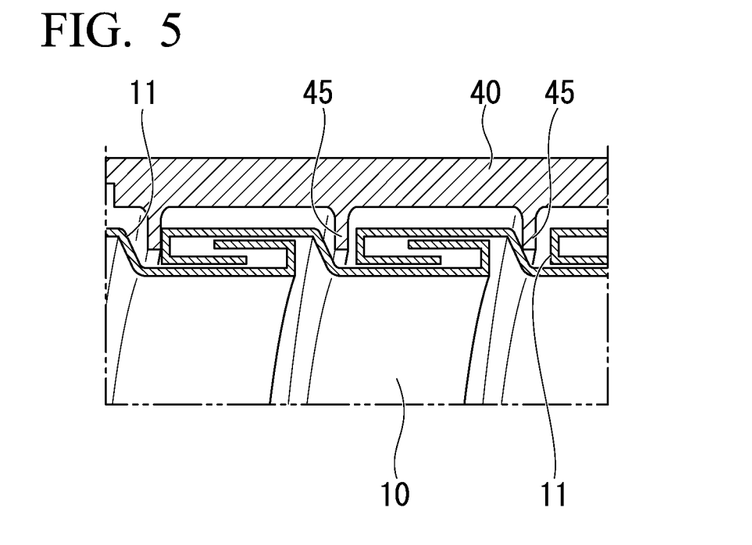
FIG. 5 is a cross-sectional view of a main part of an overlapping part between a connecting member and an inner tube.

As shown in FIGS. 4 and 5, protrusions 45 are helically formed on the inner wall of the first recess portion 42 of the connecting member 40. A protrusion pitch P2 of the protrusion 45 is the same as the groove pitch P1 of the groove 11. The outer tube 20 is not provided on the outer circumferential surface of the rear end 12 of the inner tube 10, and the protrusion 45 of the connecting member 40 and the groove 11 of the inner tube 10 are fitted to each other. That is, the connecting member 40 covers the outer circumferential surface of the rear end 12 of the inner tube 10. As a result, as shown in FIG. 3, the rear end 12 of the inner tube 10 is housed in the first recess portion 42. Therefore, the rear end 12 of the inner tube 10 is overlapped with the connecting member 40 in the radial direction. A first overlapping part 46 of the connecting member 40 and the inner tube 10 is adhered with an adhesive (not shown).

As shown in FIG. 3, the rear end 21 of the outer tube 20 is housed in the second recess portion 43. That is, a front end 40B of the connecting member 40 covers the outer circumferential surface of the rear end 21 of the outer tube 20. The rear end 21 of the outer tube 20 is in contact with the second recess portion 43 without a gap, and is overlapped with the connecting member 40 in the radial direction. A second overlapping part 47 between the connecting member 40 and the outer tube 20 is adhered with an adhesive (not shown).

As described above, the optical cable traction terminal structure 1A comprises: the inner tube 10 that can house the optical cable 2 inside and is formed by helically connecting the strand 10A; and the flexible outer tube 20 provided on the outer circumferential surface of the inner tube 10, and a part of the outer tube 20 enters the inside of the groove 11 formed on the outer circumferential surface of the inner tube 10. With such a configuration, a part of the outer tube 20 penetrates (closely adheres) to the inner surface of the groove 11 of the inner tube 10, such that the extensibility and the compressibility are improved. That is, even when the traction terminal structure 1 is bent, the positional relationship between the outer tube and the inner tube does not shift. Therefore, even when a bending force is applied to the inner tube 10, the local bending stress applied to the outer tube 20 in the groove 11 disappears, and the outer tube 20 follows the bending of the inner tube 10. As a result, the tensile stress on the outer circumferential surface of the outer tube 20 is mitigated. Then, for example, wrinkles do not occur on the outer surface of the outer tube 20 inside the bent cable, and it is possible to mitigate the unevenness generated on the outer surface. Then, a part of the outer skin is no longer locally subjected to the friction received when the optical cable traction terminal structure 1A is inserted into and towed through the duct. Therefore, since cracks are less likely to occur on the outer circumferential surface of the inner tube 10, it is possible to prevent water from entering the inner tube 10.

Further, in the optical cable traction terminal structure 1A of one or more embodiments, the connecting member 40 is provided on the outer circumferential surface of the rear end 12 of the inner tube 10. With this configuration, it is possible to prevent the connector 6 from coming into contact with the connecting member 40 as compared with the configuration in which the connecting member is provided inside the inner tube, such that damage to the connector 6 can be suppressed.

Further, since the connecting member 40 is overlapped with the rear end 12 of the inner tube 10 and also overlapped with the rear end 21 of the outer tube 20, the connecting member 40 is in surface contact with the rear end 12 of the inner tube 10 and the rear end 21 of the outer tube 20. Accordingly, it is possible to maintain the strength of the adhesive. Furthermore, the connecting member 40 can more reliably prevent water from entering the inner tube 10 by the first overlapping part 46 and the second overlapping part 47.

Although the outer tube 20 is adhered to the second recess portion 43 without a gap, there is a gap between the outer tube 20 and the second recess portion 43 of the connecting member 40, and the gap may be filled with an adhesive.

Modification Example

Figure 6:
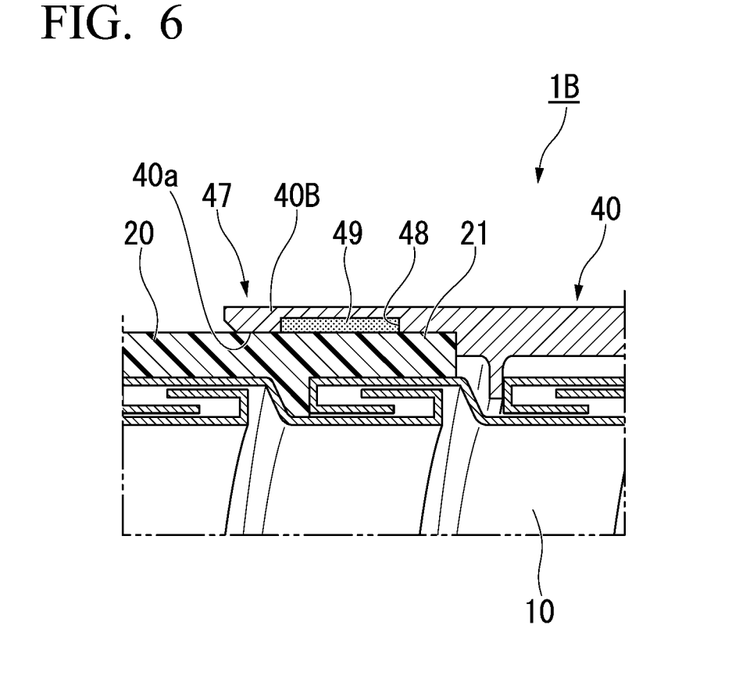
FIG. 6 is a cross-sectional view of a main part of a modification example of the optical cable traction terminal structure according to one or more embodiments.

As shown in FIG. 6, in an optical cable traction terminal structure 1B of the modification example, an adhesive is provided on the second overlapping part 47. That is, in one or more embodiments, the adhesive is provided on both the first overlapping part 46 of the connecting member 40 and the inner tube 10 and the second overlapping part 47 of the connecting member 40 and the outer tube 20, but in the modification example, the adhesive is provided only on the second overlapping part 47.

The connecting member 40 is formed with a recess portion 48 at a position facing the outer tube 20. That is, the recess portion 48 is formed on a surface 40a that comes into contact with the outer tube 20. The recess portion 48 is filled with an adhesive 49. The front end 40B of the connecting member 40 and the rear end 21 of the outer tube 20 are fixed by the adhesive 49.

In the optical cable traction terminal structure 1B, the adhesive 49 can fix the front end 40B of the connecting member 40 and the rear end 21 of the outer tube 20 and prevent water from entering from the second overlapping part 47.

Instead of the adhesive 49, the front end 40B of the connecting member 40 and the rear end 21 of the outer tube 20 may be fixed to the second overlapping part 47 by, for example, a retaining screw.

Second Example

Next, the second example will be described, but the basic configuration is the same as that of the first example. Therefore, the same configurations will be given the same reference numerals, a description thereof will be omitted, and only the different points will be described.

Figure 7:
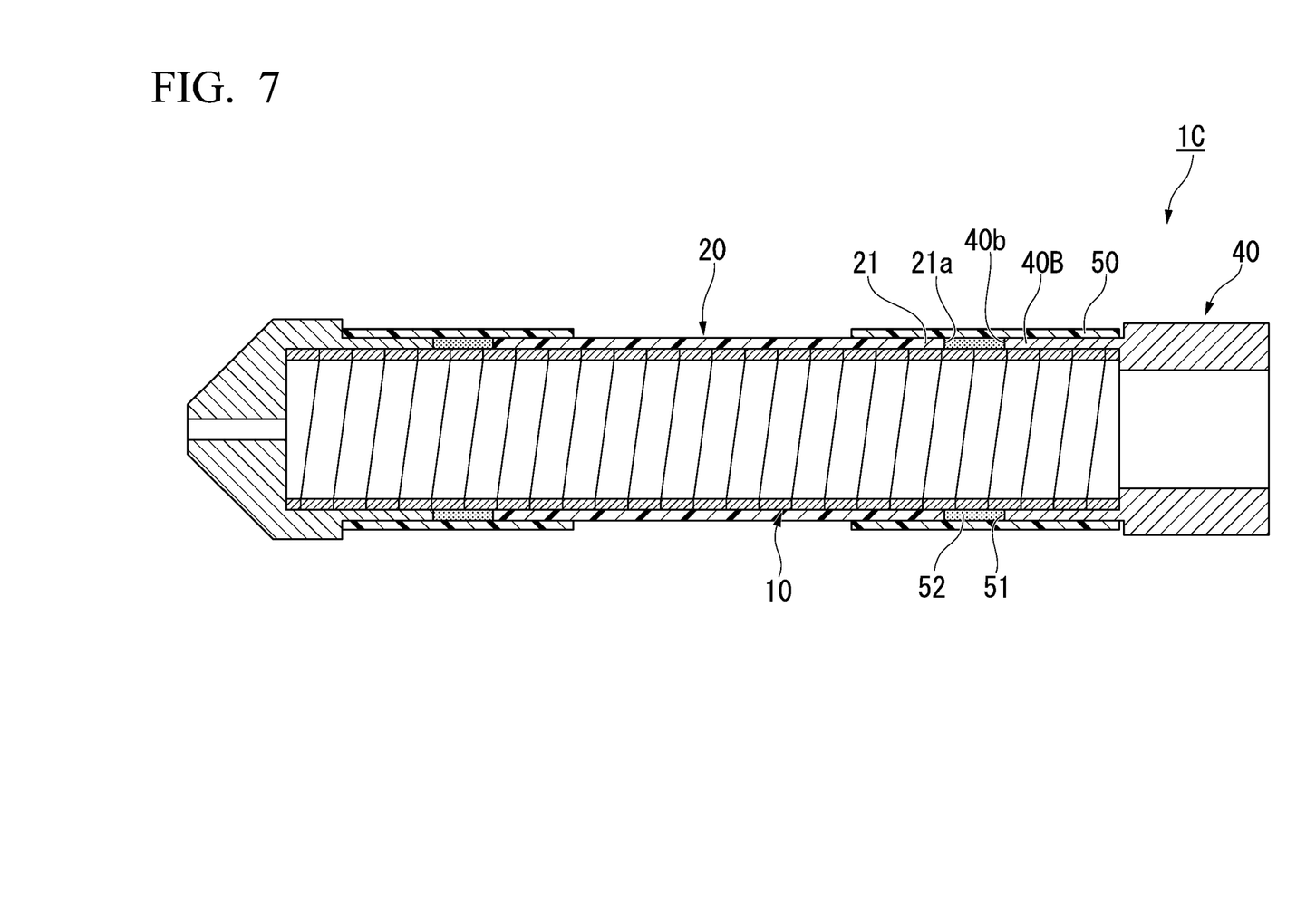
FIG. 7 is a cross-sectional view of a main part of an optical cable traction terminal structure according to one or more embodiments.

As shown in FIG. 7, an optical cable traction terminal structure 1C of the second example is different from the first example in the arrangement of the outer tube 20 and the connecting member 40. Further, in the optical cable traction terminal structure 1C of FIG. 7, the optical cable traction terminal structure 1A is simplified in order to make the drawings easier to be seen.

The second example is different from the first example in that the outer tube 20 and the connecting member 40 are arranged with spaces. That is, the rear end 21 of the outer tube 20 and the front end 40B of the connecting member 40 are spaced apart in the longitudinal direction.

The reason for leaving a space between the rear end 21 of the outer tube 20 and the front end 40B of the connecting member 40 is, for example, when fixing the connecting member 40 and the inner tube 10, there is a case where the front end surface 40b of the connecting member 40 and the outer circumferential surface of the inner tube 10 are brazed. That is, in order to prevent the outer tube 20 from being melted by heat, it is necessary to leave a space between the rear end 21 of the outer tube 20 and the front end 40B of the connecting member 40.

A waterproof and flexible tape 50 is wound to cover the outer circumference of the rear end 21 of the outer tube 20 and the outer circumference of the front end 40B of the connecting member 40.

A gap 51 is formed by a rear end surface 21a of the outer tube 20, a front end surface 40b of the connecting member 40, the outer circumferential surface of the inner tube 10, and the inner circumferential surface of the tape 50. For example, a urethane gel (water blocking member: resin material) 52 is provided in the gap 51. The size of the urethane gel 52 is larger than the size of the gap 51, and the urethane gel 52 is arranged in the gap 51 in a compressed state.

In the optical cable traction terminal structure 1C of one or more embodiments, the outer tube 20 and the connecting member 40 are arranged with spaces in the longitudinal direction of the inner tube 10, and the urethane gel 52 is provided in the gap 51. With such a configuration, it is possible to prevent water from entering the inner tube 10 by the urethane gel 52 while preventing the outer tube 20 from melting.

Further, by using a resin material (for example, urethane gel) as the water blocking member, even when the optical cable traction terminal structure 1C is extended in the longitudinal direction by a traction force, the resin material follows the extension, such that water can be prevented from entering the inner tube 10.

Third Example

Next, the third example will be described, but the basic configuration is the same as that of the first example. Therefore, the same configurations will be given the same reference numerals, a description thereof will be omitted, and only the different points will be described.

In the first example, the relationship between the elastic modulus of the inner tube 10 and the elastic modulus of the outer tube is not particularly limited, but in the optical cable traction terminal structure of the third example, the elastic modulus (Young's modulus) of the outer tube 20 is made of a material having a higher elastic modulus (Young's modulus) than that of the inner tube 10.

With this configuration, the optical cable traction terminal structure may bend as a whole optical cable traction terminal structure due to the applied force, but when the force applied to the optical cable traction terminal structure is released, the shape thereof is restored to a linear shape. Further, since the material of the outer tube 20 is a polyolefin resin as in the first example, the material has elasticity in the longitudinal direction as well. With such a configuration, when the operator routes the optical cable traction terminal structure, a force is applied to the optical cable traction terminal structure to flex the inner tube 10 to the maximum curvature, and then when the force is released, the elastic force of the outer tube 20 acts in the direction of returning the curvature. Therefore, it is possible to return the bending of the outer tube 20. As a result, workability is significantly improved.

Figure 8:
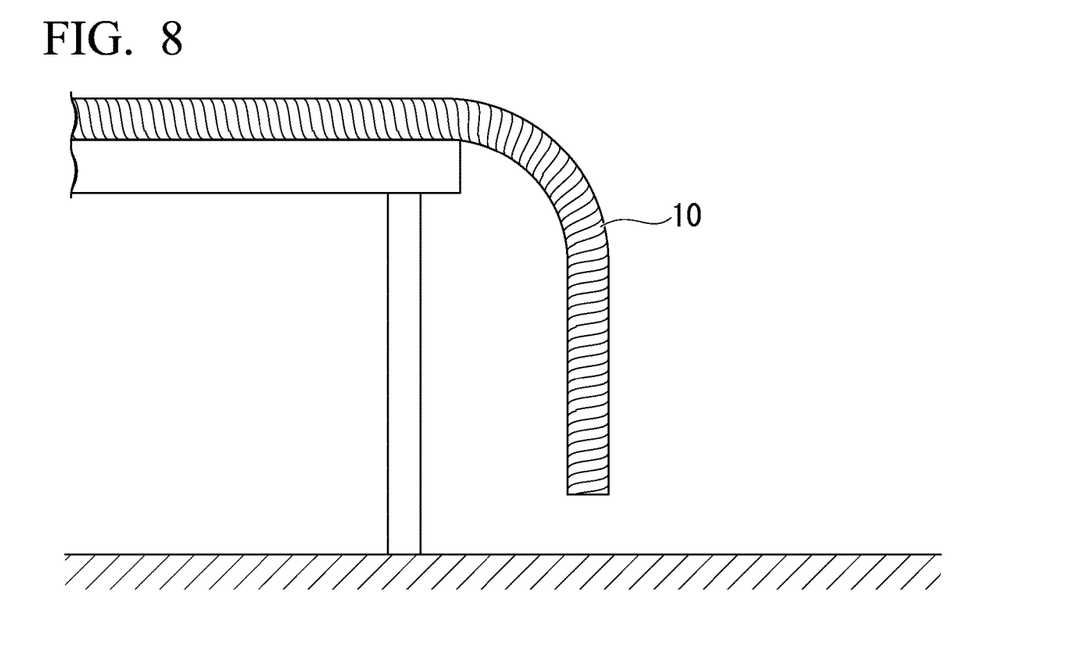
FIG. 8 is a view showing an inner tube which is not coated with an outer tube.

Next, the elastic restoring force of the optical cable traction terminal structure will be specifically shown. FIG. 8 is a view showing the inner tube 10 which is not coated with the outer tube 20, and FIG. 9 is a view showing the inner tube 10 coated with the outer tube 20.

As shown in FIG. 8, it can be seen that the inner tube 10 which is not coated with the outer tube 20 maintains the curvature state because the restoring force for returning from the once bent state to the linear state does not occur.

Figure 9:
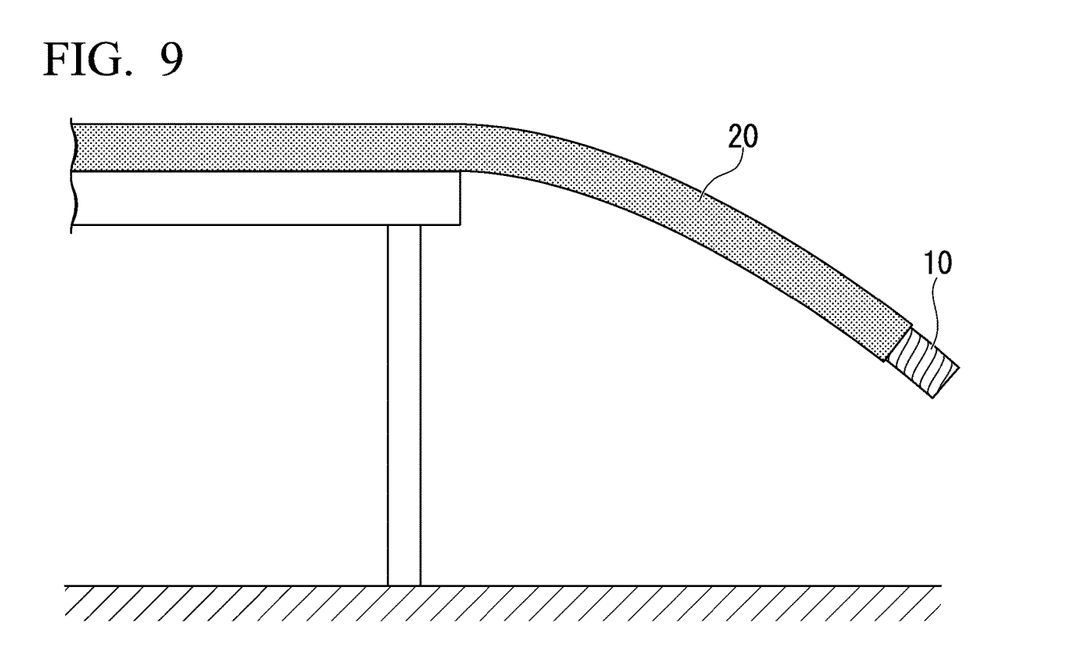
FIG. 9 is a view showing an inner tube coated with the outer tube.

On the other hand, as shown in FIG. 9, in the inner tube 10 coated with the outer tube 20, it can be seen that the force of the once bent outer tube 20 to return to the linear state acts on the inner tube 10. FIG. 9 shows a state where the outer tube 20 is bent due to its own weight, but when the inner tube 10 coated with the outer tube 20 is routed in an actual duct pipe, the force to return to the substantially linear state acts. As a result, it is possible to obtain an optical cable traction terminal structure that is easy to bend when it is desired to be bent and can be easily returned to a linear state where the traction is easy when performing traction after bending.

Figure 10:
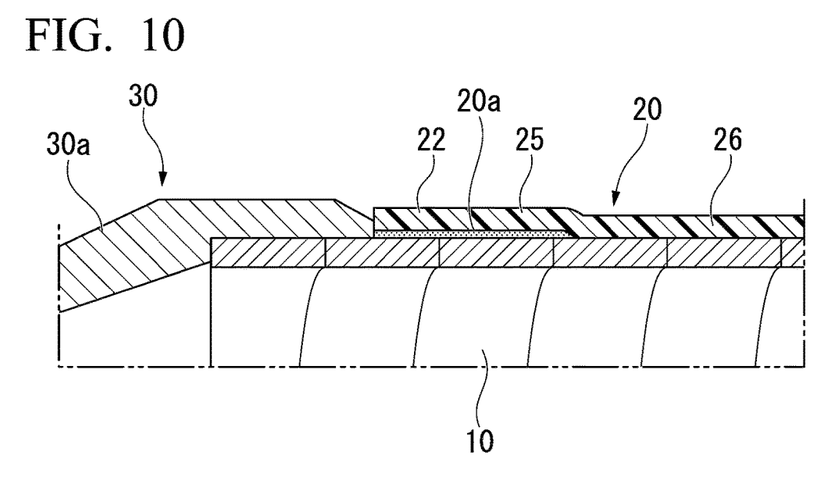
FIG. 10 is a view showing a part of a tip end side of an optical cable traction terminal structure of one or more embodiments.

FIG. 10 is a view showing a part of a tip end side of the optical cable traction terminal structure of one or more embodiments. As shown in FIG. 10, the outer tube 20 has a first part 25 to which an adhesive 20a is provided, and a second part 26 to which the adhesive 20a in not provided. The first part 25 is provided at the front end 22 of the outer tube 20. By this first part 25, the inner tube 10 and the outer tube 20 are in close contact with each other at least one circumference (the entire circumference in the circumferential direction) of the outer tube 20 in the longitudinal direction.

Further, at the rear end 21 of the outer tube 20, similarly to the front end 22, the outer tube 20 has a first part (not shown) to which an adhesive is provided, and a second part (not shown) to which an adhesive is not provided. Also at the rear end 21, the inner tube 10 and the outer tube 20 are in close contact with each other by the first part. Accordingly, it is possible to prevent water from entering the inner tube 10 of the optical cable traction terminal structure.

Figure 11:
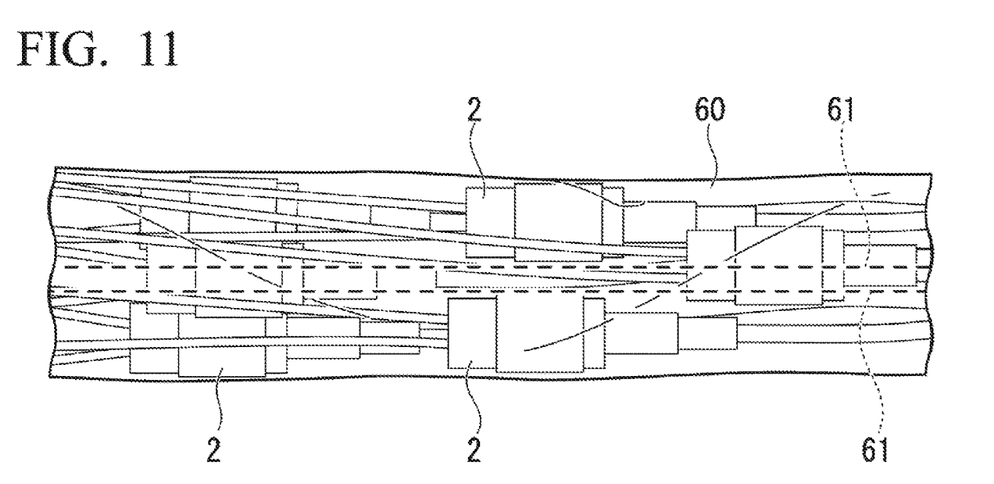
FIG. 11 is a view of an optical cable housed inside the optical cable traction terminal structure.

FIG. 11 is a view of an optical cable housed inside the optical cable traction terminal structure. As shown in FIG. 1, there are provided a plurality of optical cables 2. The plurality of optical cables 2 are covered with a transparent PVC (polyvinyl chloride) sheet 60. The PVC sheet 60 is contracted to match the shape of a plurality of optical cables, and has, for example, a cut (perforation) 61 in the longitudinal direction thereof. The number of cuts 61 is two in parallel along the longitudinal direction. That is, after the optical cable traction terminal has been inserted into the duct pipe, the sheet 60 can be easily peeled off by the cut 61 when actually connecting to another optical fiber. In one or more embodiments, the number of cuts 61 is two in parallel along the longitudinal direction, but may be one or three or more.

The technical scope of the present invention is not limited to the above-described embodiments, and various modifications can be made without departing from the spirit of the present invention, and the above-described embodiments and modification examples may be appropriately combined.

For example, the material of the inner tube 10 is stainless steel, but the material is not limited thereto. The material of the inner tube 10 may be made of plastic instead of metal.

Further, although the holder 4 is fixed to the inner tube 10 by the bolt 7 via the connecting member 40, the holder 4 may be directly fixed to the inner tube 10.

Further, in one or more embodiments, the inner tube 10 is configured such that the stainless steel plates are fitted by approximately ⅓ in the width direction and connected helically, but the inner tube 10 may not be fitted. In this case, it is possible to change the inner diameter of the inner tube 10.

REFERENCE SIGNS LIST 1A, 1B, C: Optical cable traction terminal structure
2: Optical cable
10: Inner tube
11: Groove
12: Rear end of inner tube
20: Outer tube
40: Connecting member
45: Protrusion
52: Water blocking member

What is claimed is:
1. An optical cable traction terminal structure comprising:
a helically wound inner tube that houses an optical cable; and
a flexible outer tube disposed on an outer circumferential surface of the helically wound inner tube, wherein
a part of the flexible outer tube enters an inside of a groove on the outer circumferential surface of the helically wound inner tube, and
a connecting member:
is disposed on the outer circumferential surface of a rear end of the helically wound inner tube,
overlaps the rear end of the helically wound inner tube and a rear end of the flexible outer tube, and is adhered to the rear end of the flexible outer tube at least where the connecting member overlaps the rear end of the flexible outer tube.

2. The optical cable traction terminal structure according to claim 1, wherein a protrusion on an inner wall of the connecting member is fitted into the groove of the helically wound inner tube.

3. The optical cable traction terminal structure according to claim 1, wherein, the connecting member has a recess portion, at a position facing the flexible outer tube where the connecting member overlaps the rear end of the flexible outer tube, in which an adhesive is disposed.

4. An optical cable traction terminal structure comprising:

a helically wound inner tube that houses an optical cable; and a flexible outer tube disposed on an outer circumferential surface of the helically wound inner tube, wherein a part of the flexible outer tube enters an inside of a groove on the outer circumferential surface of the helically wound inner tube, a connecting member is disposed on the outer circumferential surface of a rear end of the helically wound inner tube, and a water blocking member is disposed in a gap between the flexible outer tube and the connecting member in a longitudinal direction of the helically wound inner tube.

5. The optical cable traction terminal structure according to claim 4, wherein the water blocking member includes a resin material.

6. The optical cable traction terminal structure according to claim 1, wherein the connecting member overlaps the rear end of the helically wound inner tube and a rear end of the flexible outer tube.

\* \* \* \* \*